S. B. Niles,
Bean Harvester.

No. 89,164.  Patented April 20, 1869.

Witnesses  
John F. Brooks  
E. Greene Tolhot

Inventor  
S. B. Niles  
per Munn & Co  
Attorneys.

S. R. NILES, OF RAWSONVILLE, MICHIGAN.

Letters Patent No. 89,164, dated April 20, 1869.

IMPROVEMENT IN MACHINE FOR PULLING BEANS.

The Schedule referred to in these Letters Patent and making part of the same.

*To all whom it may concern:*

Be it known that I, S. R. NILES, of Rawsonville, in the county of Wayne, and State of Michigan, have invented a new and improved Machine for Pulling Beans; and I do hereby declare that the following is a full, clear, and exact description thereof, which will enable others skilled in the art to make and use the same, reference being had to the accompanying drawings, forming part of this specification.

This invention relates to improvements in bean-pulling machines, designed to provide a simple and effective machine, of cheap construction, with an improved arrangement of adjustable truck-device, capable of being readily adjusted, to permit the machine to be worked, or hold it out of the working-position, and support it while moving to or from the field, or along the road.

Figure 1:
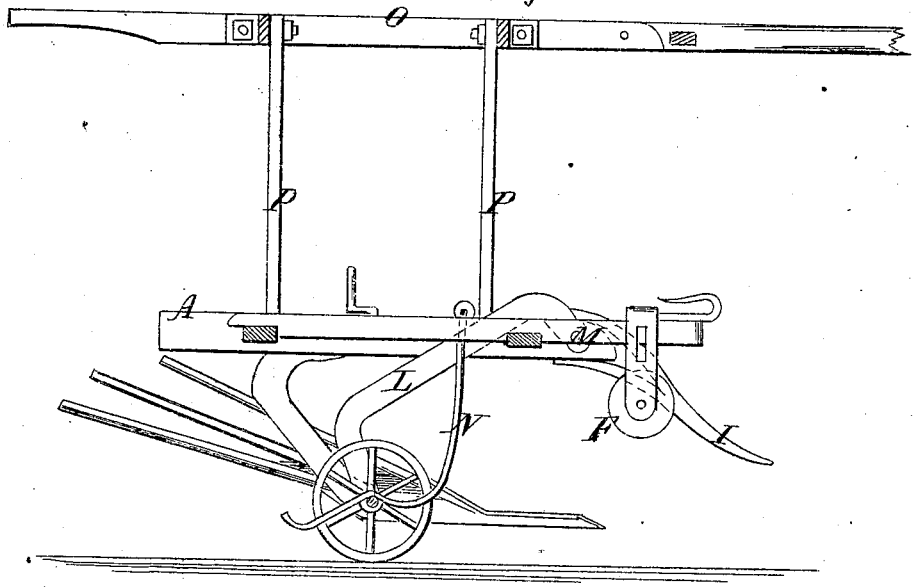
Figure 2:
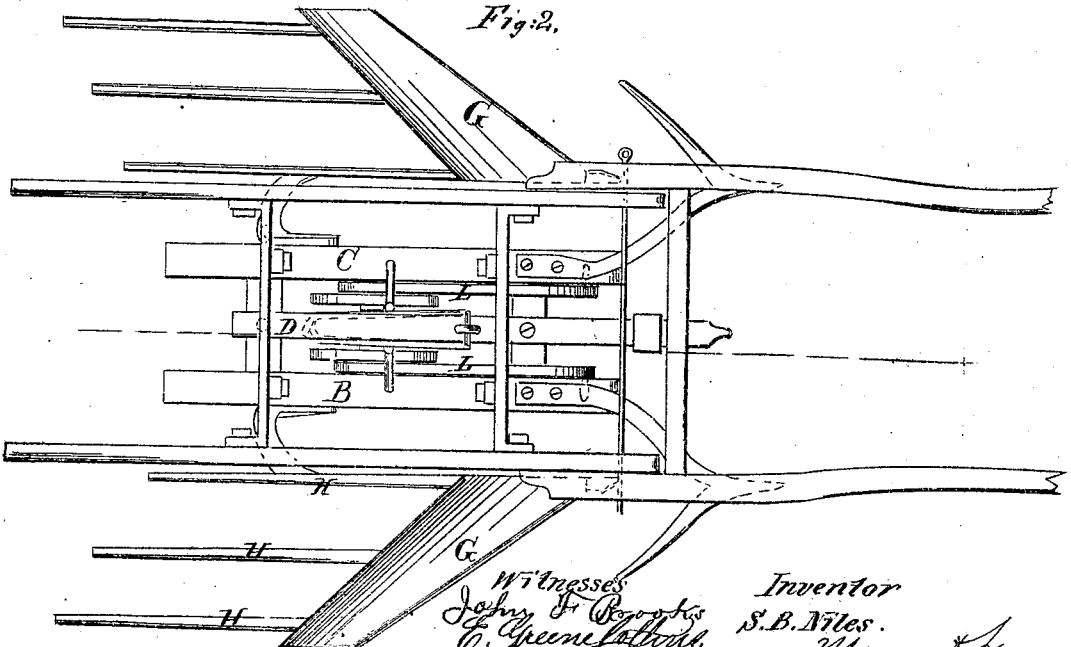

Figure 1 represents a longitudinal sectional elevation of my improved machine, and Figure 2 represents a plan view of the same.

Similar letters of reference indicate corresponding parts.

A represents a rectangular frame, composed of two side-pieces, B and C, a central beam, D, and two transverse beams, E.

From the front end of the central beam, D, a guide-wheel, F, is adjustably suspended, to regulate the depth of the plows G, which are broad pointed plates, slightly curved upward, projecting angularly from each side of the frame, and having three or more rods, H, projecting rearward, for separating the earth from the vines.

I represents branched gathering-forks, designed to run along inside of the rows, between which the machine is operating, and gather the vines branching in that direction, and turn them outward in advance of the plows G, which are designed to run along under the vines sufficiently below ground to pull them out, when they will be delivered over the rods H, and separated from the earth.

K represents the wheels of a small truck suspended from the lower ends of the bent arms L, pivoted to the frame at M, and so shaped that when it is required to work the machine, the wheels may be permitted to run freely along the top of the ground without supporting the machine, the said arms rising up between the longitudinal beams of the machine; but when the machine is required to be moved along the ground without acting thereon, the said truck supports it in an elevated position, by means of the bent rods N, also pivoted to the frame between the axis of the arms L, and the ends supporting the wheels; these bent rods being so shaped that when the frame is raised, and they are engaged with the axle, they, together with the arms L, support the said frame in the elevated position.

For guiding the machine, a pair of shafts and a pair of handles are connected at the respective ends of another frame, O, supported in an elevated position, above the frame A, by vertical supports P.

Having thus described my invention,

I claim as new, and desire to secure by Letters Patent—

1. The combination, with the frame A, of the arms L, supporting the truck-wheels and the bent rods N, substantially as specified.

2. The combination, with the plows G of the gathering-forks I, substantially as specified.

S. R. NILES.

Witnesses:
E. S. BUTTS,
G. H. SHERMAN.